US012731919B2

(12) United States Patent
Ono et al.

(10) Patent No.: US 12,731,919 B2
(45) Date of Patent: Sep. 8, 2026

(54) UNIPOLAR TERMINAL BLOCK HAVING A SLIPPING-PREVENTION PORTION

(71) Applicant: Yazaki Corporation, Tokyo (JP)

(72) Inventors: Hiroaki Ono, Makinohara (JP); Toru Suzuki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 352 days.

(21) Appl. No.: 18/597,528

(22) Filed: Mar. 6, 2024

(65) Prior Publication Data

US 2024/0332830 A1 Oct. 3, 2024

(30) Foreign Application Priority Data

Mar. 27, 2023 (JP) ................................ 2023-049259

(51) Int. Cl.
*H01R 4/70* (2006.01)
*H01R 43/20* (2006.01)

(52) U.S. Cl.
CPC ............... *H01R 4/70* (2013.01); *H01R 43/20* (2013.01)

(58) Field of Classification Search
CPC ........... H01R 4/70; H01R 9/2608; H01R 9/24
USPC .................................. 439/744, 721–723, 21
See application file for complete search history.

(56) References Cited

U.S. PATENT DOCUMENTS 5,915,998 A * 6/1999 Stidham ............. H01R 13/5213 439/798
5,934,945 A * 8/1999 Petersen .............. H01R 13/426 439/744
7,530,843 B1 * 5/2009 Tesfay ................. H01R 13/521 439/587
7,942,707 B2 * 5/2011 Orris .................... H01R 13/432 439/748
10,594,058 B2 * 3/2020 Kan ..................... H05K 5/0247
2016/0126657 A1 5/2016 Hirakawa et al.
2019/0006775 A1 * 1/2019 Kan ....................... H01R 11/28
2024/0332879 A1 * 10/2024 Ono .................. B29C 45/14065
2024/0332880 A1 * 10/2024 Ono ....................... H01R 43/24

FOREIGN PATENT DOCUMENTS

JP 2011108633 A * 6/2011 ............. H01R 13/06
JP 2014-154255 A 8/2014
JP 2014220045 A * 11/2014 ............. H01R 13/52
JP 2022-52013 A 4/2022

* cited by examiner

*Primary Examiner* — Hae Moon Hyeon
(74) *Attorney, Agent, or Firm* — Sughrue Mion, PLLC

(57) ABSTRACT

A unipolar terminal block includes a terminal having a first connection portion formed at one end side, a second connection portion formed at the other end side, and a central portion formed in a cylinder shape; and a resin portion holding the central portion of the terminal, wherein the resin portion includes a holding hole having a circular cross section and through which the central portion of the terminal is passed, and a slipping-prevention portion engaging with the central portion of the terminal, and the terminal is held to be rotatable with respect to the resin portion.

5 Claims, 5 Drawing Sheets

UNIPOLAR TERMINAL BLOCK HAVING A SLIPPING-PREVENTION PORTION

TECHNICAL FIELD

The present invention relates to a terminal block.

BACKGROUND ART

There are various structures included in terminal blocks for wiring connections, and an example thereof is shown in FIG. 7 (see Patent Document 1). A terminal block 500 shown in FIG. 7 is fixed to a housing of a travel motor mounted on a vehicle, and includes three busbars 502, two collars 503, and a housing 504 holding these configurations.

Each busbar 502 includes a first connection portion 521 and a second connection portion 522. The first connection portion 521, for example, is connected to a terminal of a motor for travelling. The second connection portion 522, for example, is connected to a terminal of an inverter.

The collar 503 is made of metal and has a cylindrical shape. A bolt for fixing the terminal block 500 to a housing of the motor for travelling is passed through the collar 503.

The housing 504 is made of insulating synthetic resin. The housing 504 is formed by filling a mold cavity with molten resin and solidifying the molten resin. Also, the busbar 502 and the collar 503 are set in the mold cavity when the housing 504 is molded, and are insert-molded into the housing 504.

In addition to the terminal block 500 described above, there are terminal blocks of various shapes to match the mounting conditions of each vehicle.

CITATION LIST

Patent Documents

[Patent Document 1] JP 2022-52013A

SUMMARY OF THE INVENTION

Technical Problem

With regard to manufacturing the terminal blocks of various shapes described above, it is necessary to construct a mold for each product, which leads to a problem of increasing development time and cost.

Accordingly, an object of the present invention is to provide a unipolar terminal block that can correspond to various specifications.

Solution to Problem

According to the present invention, a unipolar terminal block includes a terminal having a first connection portion formed at one end side, a second connection portion formed at the other end side, and a central portion formed in a cylinder shape; and a resin portion holding the central portion of the terminal, wherein the resin portion includes a holding hole having a circular cross section and through which the central portion of the terminal is passed, and a slipping-prevention portion engaging with the central portion of the terminal, and the terminal is held to be rotatable with respect to the resin portion.

According to the present invention, a manufacturing method for the above-described unipolar terminal block includes molding the terminal and the resin portion individually; and press-fitting and assembling the terminal into a holding hole of the resin portion.

According to the present invention, a manufacturing method for the above-described unipolar terminal block includes applying a lubricant to the terminal that is molded in advance; setting the terminal to which the lubricant is applied into a cavity of a mold unit for molding the resin portion; and filling molten resin into the cavity to mold the resin portion.

Effect of the Invention

According to the present invention, it is possible to provide a unipolar terminal block that can correspond to various specifications.

DESCRIPTION OF EMBODIMENTS

A unipolar terminal block and a manufacturing method for the unipolar terminal block according to a first embodiment of the present invention will be described with reference to FIG. 1 and FIG. 2.

Figure 1:
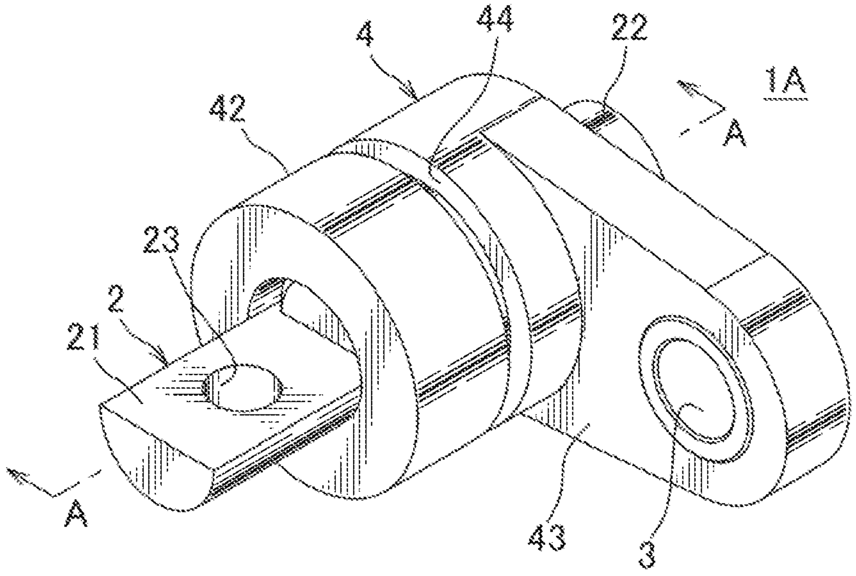
FIG. 1 is a perspective view showing a unipolar terminal block according to a first embodiment of the present invention.
Figure 2:
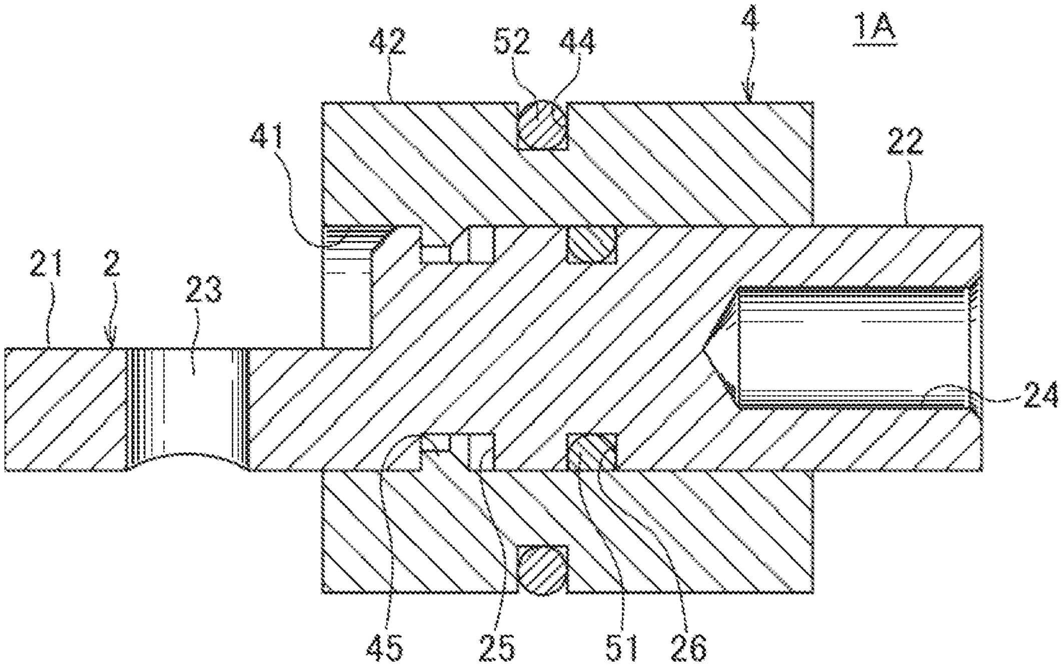
FIG. 2 is a cross-sectional view taken along a line A-A in FIG. 1.

A unipolar terminal block 1A shown in FIG. 1 and FIG. 2 is a component for connecting wires to each other. This unipolar terminal block 1A includes a unipolar terminal 2 in which a first connection portion 21 is formed on one end side, a second connection portion 22 is formed on the other end side, and a central portion is formed in a cylindrical shape, a collar 3, and a resin portion 4 to hold the terminal 2 and the collar 3.

The first connection portion 21 is formed in a semi-cylindrical shape as a shape obtained by dividing a cylinder into two along a plane passing through a central axis thereof, and includes a bolt insertion hole 23.

The second connection portion 22 is formed in a cylindrical shape and includes a female threaded portion 24. The female threaded portion 24 includes a hole formed concavely from the other end of the terminal 2, and a screw cut spirally on the inner circumferential surface of the hole.

An annular groove 25 with which a slipping-prevention portion 45 of the resin portion 4 is engaged and an annular packing attachment groove 26 to which an annular packing 51 is attached are formed on the outer circumferential surface of the central portion of the terminal 2.

The collar 3 is made of metal and has a cylindrical shape. A bolt for fixing the unipolar terminal block 1A to an attached portion is passed through the collar 3.

The resin portion 4 is configured of an insulating synthetic resin, and includes a cylindrical terminal holding portion 42 and a plate-shaped collar holding portion 43 continuous to the outer circumferential surface of the terminal holding portion 42. The terminal holding portion 42 includes a holding hole 41 having a circular cross section through which the central portion of the terminal 2 is passed, and a slipping-prevention portion 45 that engages with the groove 25 of the terminal 2. The slipping-prevention portion 45 is an annular rib protruding from the inner circumferential surface of the holding hole 41. An annular packing attachment groove 44 for attaching an annular packing 52 is formed on the outer circumferential surface of the terminal holding portion 42.

Regarding the terminal 2, a first connection portion 21 protrudes from one end surface of the terminal holding portion 42, a second connecting portion 22 protrudes from the other end surface of the terminal holding portion 42, and a central portion is positioned in the holding hole 41. The terminal 2 is rotatably held relative to the resin portion 4 by the slipping-prevention portion 45 engaging in the groove 25. Also, due to the packing 51 attached to the packing attachment groove 26, a gap between the outer circumferential surface of the central portion of the terminal 2 and the inner circumferential surface of the holding hole 41 is sealed.

The collar 3 is insert-molded into the resin portion 4. The outer circumferential surface of the collar 3 is covered by a collar holding portion 43. The central axis of the collar 3 is parallel to the central axis of the second connecting portion 22.

The unipolar terminal block 1A is manufactured by the following method. At first, the terminal 2 and the resin portion 4 are molded separately. Next, the packing 51 is attached to the packing attachment groove 26 of the terminal 2. Then, this terminal 2 is press-fitted into the holding hole 41 of the resin portion 4 and assembled. The unipolar terminal block 1A is manufactured by such procedures.

The unipolar terminal block TA obtained by the above-described manufacturing method is attached to an attached portion, for example, as shown in FIG. 3 and FIG. 4.

Figure 3A:
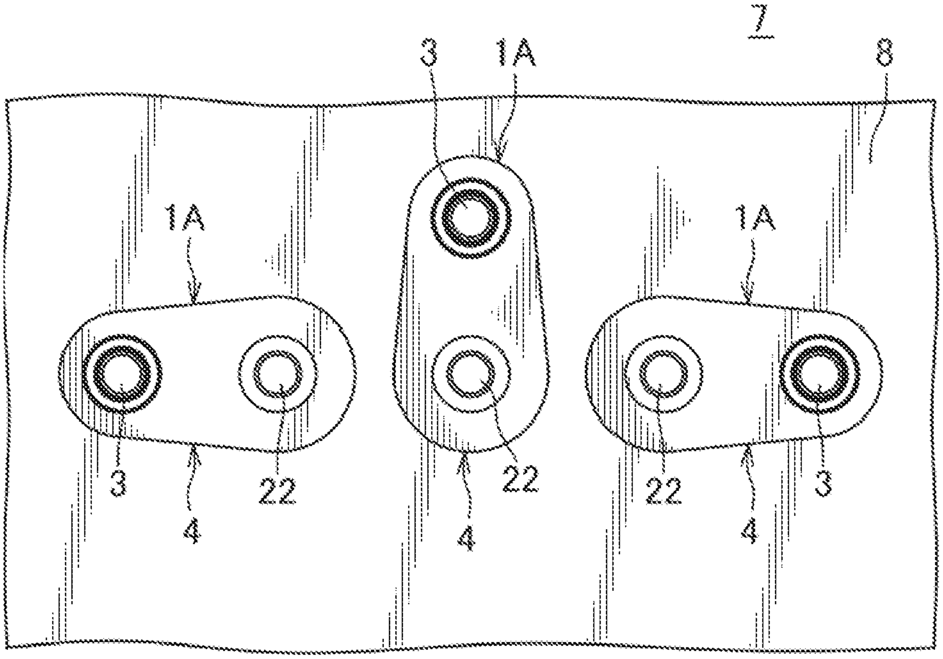
FIG. 3A is a rear view showing a terminal block assembling structure in which the unipolar terminal block in FIG. 1 is attached to an attached portion.
Figure 3B:
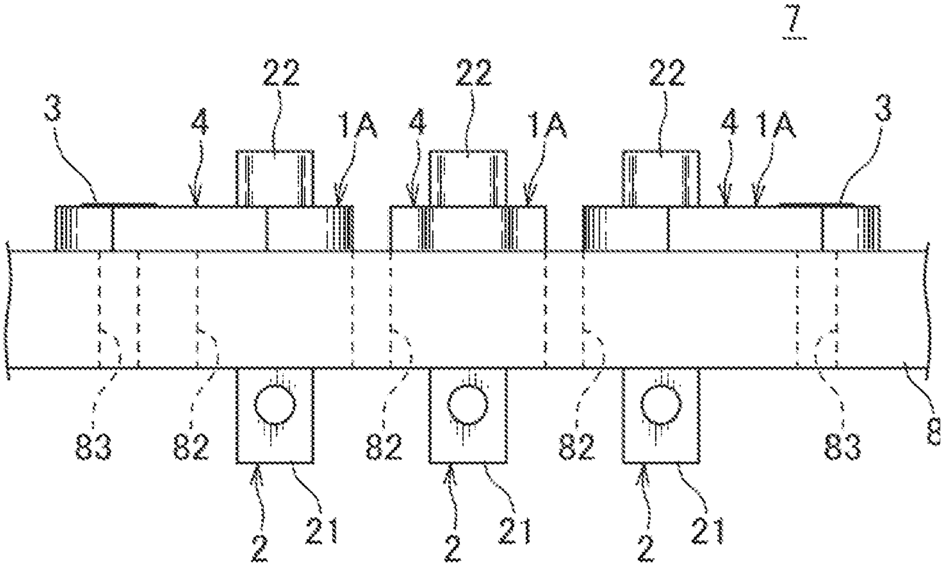
FIG. 3B is a planar view showing the terminal block assembling structure in which the unipolar terminal block in FIG. 1 is attached to the attached portion.

The terminal block assembling structure 7 shown in FIG. 3A and FIG. 3B is configured to have three unipolar terminal blocks TA attached to the attached portion 8. The three unipolar terminal blocks TA are attached to the attached portion 8 in a state in which the orientations of the bolt insertion holes 23 with respect to the collar 3 are different from each other.

The attached portion 8 is a casing of an inverter mounted on a vehicle. In the attached portion 8, three insertion holes 82 through which the terminal holding portions 42 of the unipolar terminal blocks 1A, 1D, 1E are inserted respectively, and three bolt insertion holes 83 through which the bolts inserting through the collars 3 of the unipolar terminal blocks 1A, 1D, 1E are inserted respectively are formed.

Each unipolar terminal block TA is inserted into each insertion hole 82, the bolt is inserted into each collar 3 and each bolt insertion hole 83, and a nut is screwed to the bolt such that each unipolar terminal block TA is fixed to the attached portion 8. Further, the gap between the insertion hole 82 and the terminal holding portion 42 is sealed by the packing attached to the packing attachment groove 44 of each of the unipolar terminal blocks 1A.

As shown in FIG. 3B, the first connection portion 21 of each unipolar terminal block 1A is positioned on one side of the attached portion 8, that is, on the inner side of the casing. These first connection portions 21 are overlapped by terminals of the inverter, and then fastened together by the bolts inserted through the bolt insertion holes 23 and the nuts screwed to the bolts.

As shown in FIG. 3B, the second connection portion 22 of each unipolar terminal blocks 1A is positioned on the other side of the attached portion 8, that is, on the outer side of the casing. These second connection portions 22 are overlapped with the round terminals connected to the ends of the electric wires, and then are fastened together with the round terminals by the bolts screwed into the female screw portions 24.

Since such a terminal block assembling structure 7 uses three unipolar terminal blocks 1A that are unconnected, it is possible to flexibly respond to changes of the positions of the bolt insertion holes 83 in the attached portion 8, changes of the pitch between the terminals 2, changes of the number of poles of the terminals 2, and the like. Also, regarding the unipolar terminal block TA, the terminal 2 is rotatably held with respect to the resin portion 4 such that it is possible to change the position of the collar 3 in response to the condition of the attached portion 8 (the positional relationship with other members or the like). In this manner, the unipolar terminal block TA can correspond to various specifications.

Figure 4A:
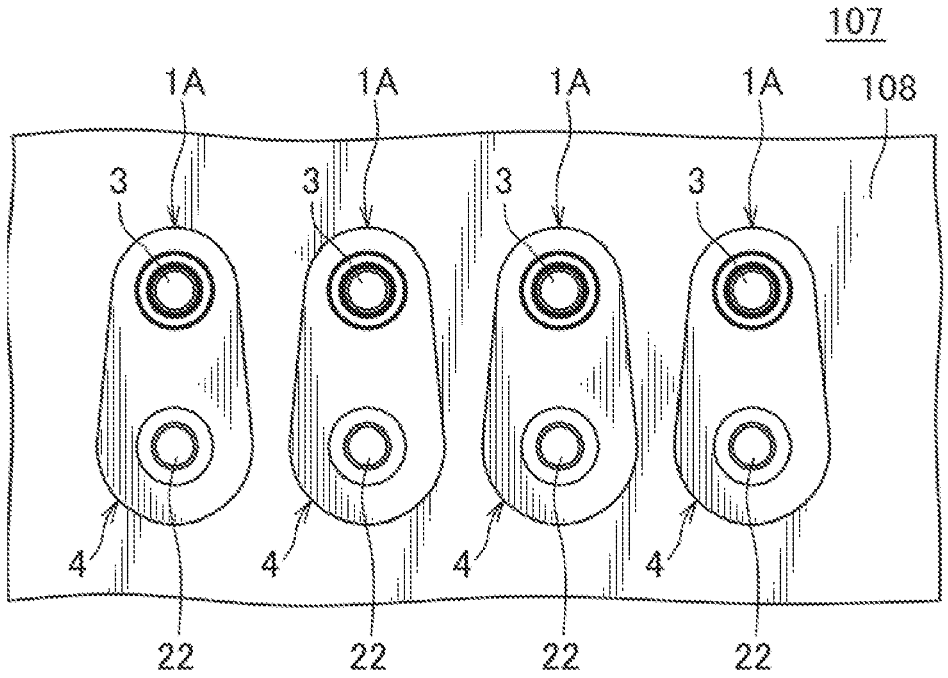
FIG. 4A is a rear view showing another terminal block assembling structure in which the unipolar terminal block in FIG. 1 is attached to the attached portion.
Figure 4B:
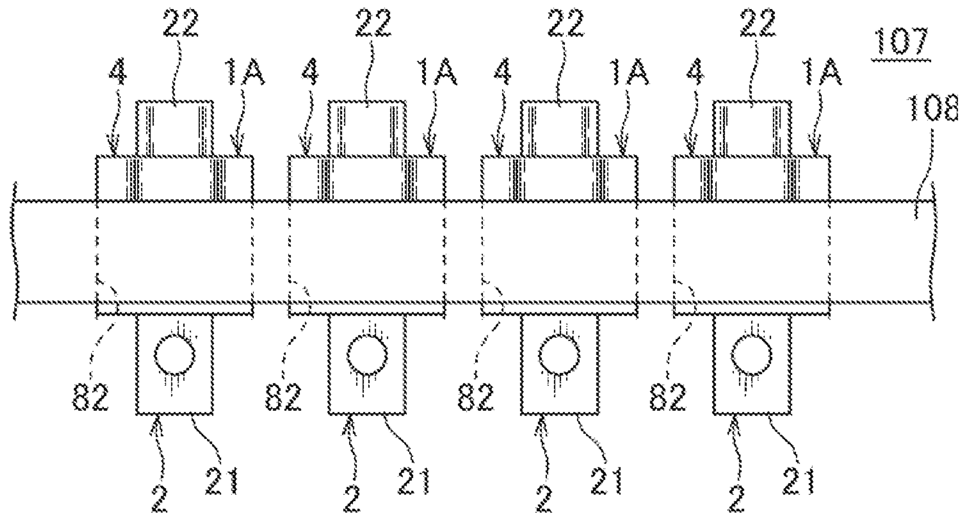
FIG. 4B is a planar view showing the other terminal block assembling structure in which the unipolar terminal block in FIG. 1 is attached to the attached portion.

The terminal block assembling structure 107 shown in FIG. 4A and FIG. 4B is configured that four unipolar terminal blocks TA are attached to an attached portion 108. Similar to the terminal block assembling structure 7, this terminal block assembling structure 107 uses four unipolar terminal blocks 1A that are unconnected such that it is possible to flexibly respond to changes of the positions of the bolt insertion holes in the attached portion 108, changes of the pitch between the terminals 2, changes of the number of poles of the terminals 2, and the like.

Figure 5:
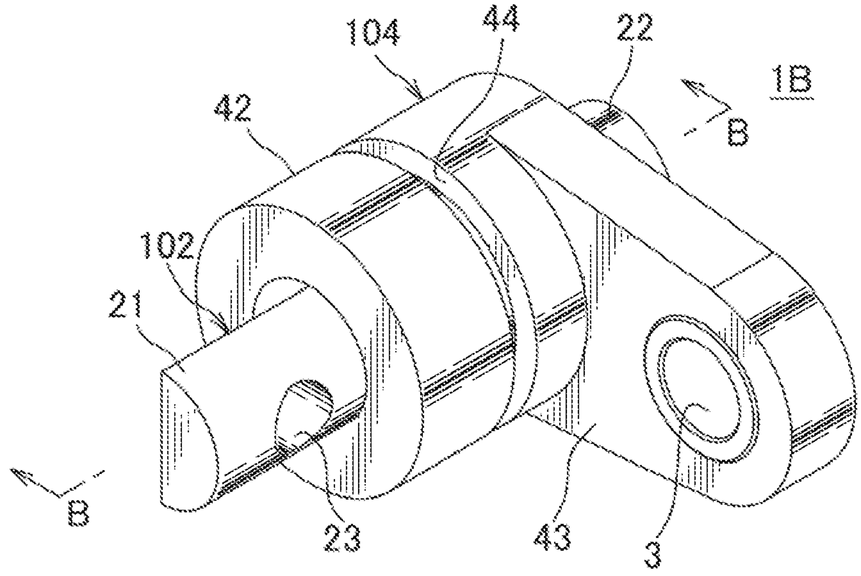
FIG. 5 is a perspective view showing a unipolar block terminal according to a second embodiment of the present invention.
Figure 6:
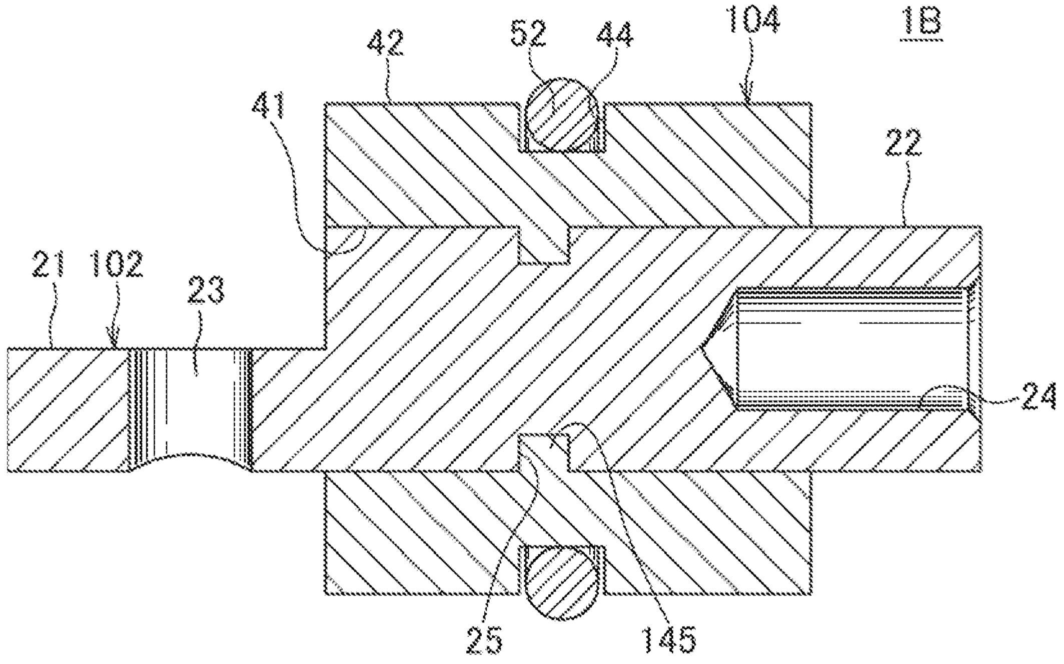
FIG. 6 is a cross-sectional view taken along a line B-B in FIG. 5.
Figure 7:
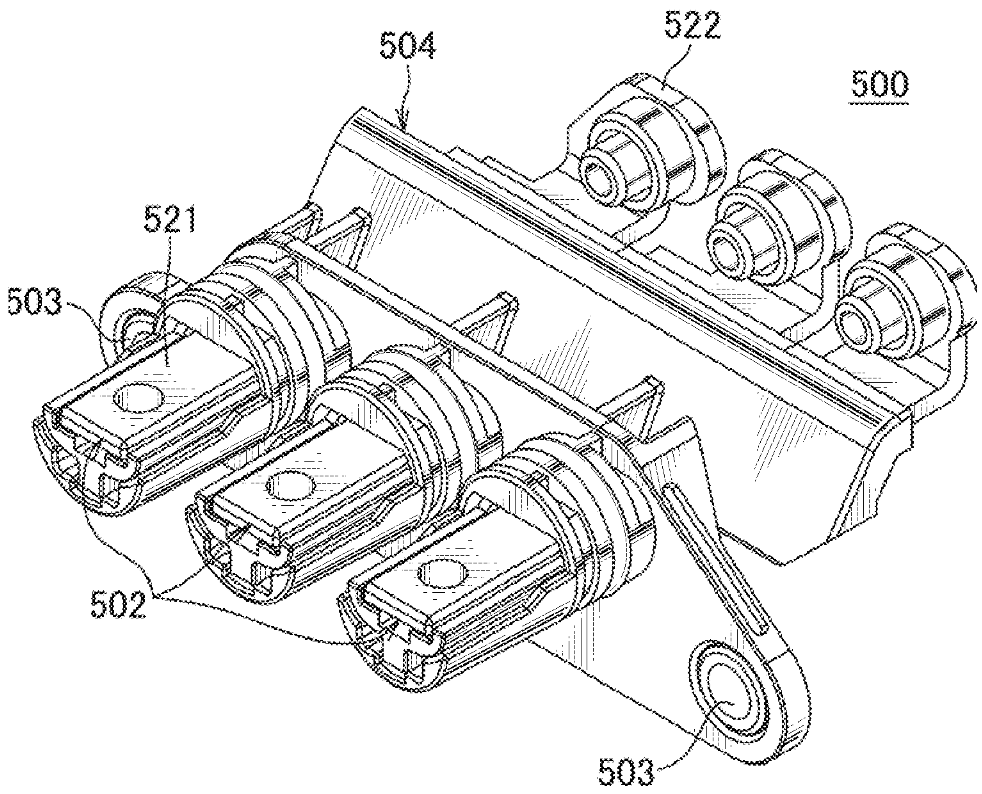
FIG. 7 (PRIOR ART)
FIG. 7 is a perspective view showing a conventional terminal block.

A unipolar terminal block and a manufacturing method for the unipolar terminal block according to a second embodiment of the present invention will be described with reference to FIG. 5 and FIG. 6. In FIG. 5 and FIG. 6, the same components as in the first embodiment are assigned with the same reference signs and the explanation thereof will be omitted.

In a unipolar terminal block 1B according to the present example, the terminal 102 is insert-molded in the resin portion 104. At the time of performing the insert-molding, a lubricant is applied to the pre-molded terminal 102, the lubricant-applied terminal 102 is set in the cavity of a mold unit for molding the resin portion 104, and the molten resin is filled in the cavity to mold the resin portion 104.

Regarding the unipolar terminal block 1B obtained by the manufacturing method described above, the terminal 102 is rotatably held with respect to the resin portion 104.

The resin portion 104 according to the present example has the same configuration as that of the resin portion 4 according to the first embodiment, except for that the tapered surface is not formed in the slipping-prevention portion 145. Also, in the unipolar terminal block 1B according to the present example, there is no necessity to seal the gap between the outer circumferential surface of the central portion of the terminal 102 and the inner circumferential surface of the holding hole 41 such that no packing is provided at the location. Accordingly, there is no packing attachment groove is formed in the central portion of the terminal 102.

The unipolar terminal block 1B according to the present example functions similarly to the unipolar terminal block TA according to the first embodiment.

Also, the above-described embodiment merely shows a typical embodiment of the present invention, and the present invention is not limited to this embodiment. That is, various modifications can be made without departing from the spirit of the present invention. Once the configurations according to the present embodiment are included, even if such modifications are applied, the configurations should be included within the scope of the present invention.

REFERENCE SIGNS LIST

1A, 1B unipolar terminal block
2, 102 terminal
3 collar
4, 104 resin portion
21 first connection portion
22 second connection portion
41 holding hole
45, 145 slipping-prevention portion

What is claimed is:

1. A unipolar terminal block, comprising:

a terminal having a first connection portion formed at one end side, a second connection portion formed at the other end side, and a central portion formed in a cylinder shape; and a resin portion holding the central portion of the terminal, wherein the resin portion includes a holding hole having a circular cross section and through which the central portion of the terminal is passed, and a slipping-prevention portion engaging with the central portion of the terminal, and the terminal is held to be rotatable with respect to the resin portion.

2. The unipolar terminal block according to claim 1, wherein the slipping-prevention portion is an annular rib protruding from an inner circumferential surface of the holding hole, and an annular groove with which the slipping-prevention portion is engaged is formed on an outer circumferential surface of the central portion of the terminal.

3. The unipolar terminal block according to claim 1, further comprising a cylindrical collar that is held by the resin portion.

4. A manufacturing method for the unipolar terminal block according to claim 1, comprising:

molding the terminal and the resin portion individually; and press-fitting and assembling the terminal into the holding hole of the resin portion.

5. A manufacturing method for the unipolar terminal block according to claim 1, comprising:

applying a lubricant to the terminal that is molded in advance;

setting the terminal to which the lubricant is applied into a cavity of a mold unit for molding the resin portion; and filling molten resin into the cavity to mold the resin portion.

* * * * *